United States Patent [19]
Beeken

[11] 3,733,580
[45] May 15, 1973

[54] ACOUSTICAL SENSING CURTAIN
[75] Inventor: Basil B. Beeken, New Haven, Conn.
[73] Assignee: Pitney-Bowes, Inc., Stamford, Conn.
[22] Filed: Dec. 22, 1970
[21] Appl. No.: 100,686

[52] U.S. Cl.................340/1 R, 340/8 FT, 340/16 R
[51] Int. Cl................................................G01s 9/66
[58] Field of Search.....................340/1 R, 3 E, 3 R,
340/8 FT, 16 R; 181/.5 NP

[56] References Cited

UNITED STATES PATENTS 2,783,459  2/1957  Lienau et al..........................340/3 E
3,491,332  1/1970  Lomas et al. ........................340/1 R
2,927,284  3/1960  Worrell et al......................340/8 FT Primary Examiner—Richard A. Farley
Attorney—Alan H. Levine

[57] ABSTRACT

A collimated acoustical beam is propagated along a tortuous path by being successively reflected back and forth across a given field so that the successive path portions compositely define a substantially continuous acoustical sensing curtain; said beam being adapted to control an acoustically sensitive device. When an object to be sensed penetrates said curtain, at any point in the latter, said beam will be momentarily interrupted and a resultant output signal will thereby be generated by said acoustically sensitive device.

9 Claims, 1 Drawing Figure

Patented May 15, 1973 3,733,580
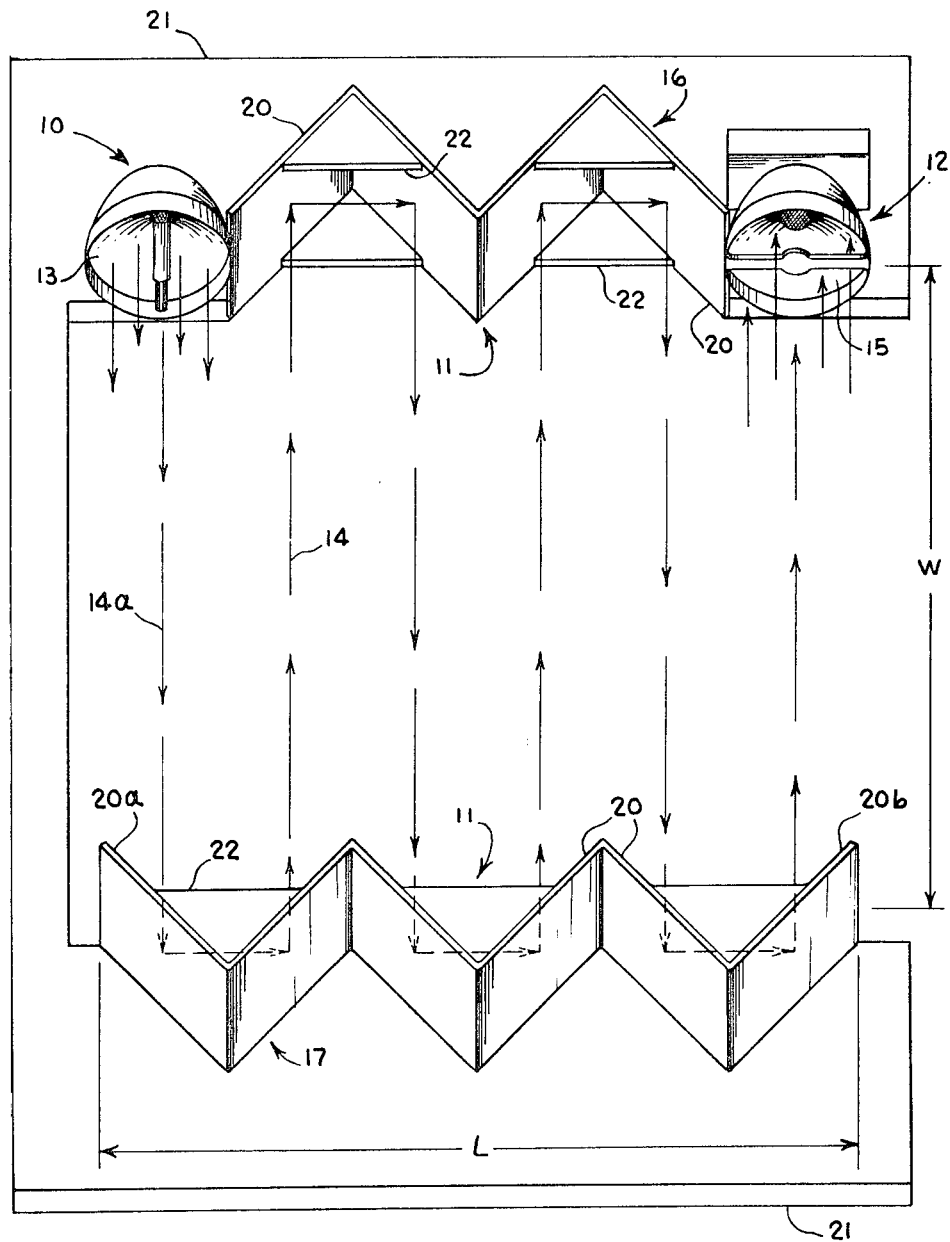
INVENTOR
BASIL B. BEEKEN
BY
Albert W. Scribner
ATTORNEY

ACOUSTICAL SENSING CURTAIN

BACKGROUND OF THE INVENTION

Sensing systems utilizing acoustical generators and associated acoustically sensitive devices are well-known in the art and are commonly used where objects to be sensed move along some fairly well defined path. However these types of systems, which are illustrated in my U. S. Pat. No. 3,500,952, are not efficiently adapted to detect the presence of objects that are to be moved along any one of many possible widely separated paths, and this functional limitation unduly restricts the development of the full potential use of acoustical sensing systems.

SUMMARY OF THE INVENTION

The instant invention contemplates an acoustical generating means, such as a whistle, that is used to generate and collimate a high frequency acoustical beam that is directed towards a first reflector which reflects said beam laterally to a second reflector which in turn redirects said beam in a direction that is substantially opposite the direction of the initial portion of said generated beam. By the use of a plurality of additional and similarly arranged acoustical reflectors said beam may be directed back and forth across an area or field to an acoustical sensing means; the sensing means preferably including a flow mode device. The tortuous type path thus followed by said beam effectively defines an acoustical curtain which when penetrated at any point by an object larger than a given minimum size will cause said acoustical sensitive device to initiate an output signal.

The primary object of the instant invention is to provide a novel arrangement of acoustical reflectors between an acoustical generating means and an acoustical sensing means whereby a collimated beam, in traveling between said generating and sensing means, follows a multi-directional path which effectively composites defines an acoustical sensing curtain, the system being capable of detecting when an object moves into or through said curtain at any point of the latter.

Other objects will become apparent as the disclosure progresses.

In the drawings:

FIG. 1 is a perspective view illustrating the layout for the sonic generator, the various sonic wave beam reflectors and the sonic ear or acoustical sensing means.

DETAILED DESCRIPTION OF THE INVENTION

Referring to the drawing there is shown an acoustical generating means 10, an acoustical reflecting means 11, and an acoustically sensitive means 12. The generating means 10 and sensing means 12 are preferably of the types described and illustrated in said U. S. Pat. No. 3,500,952 whereby said means 10 comprises a whistle and said means 12 includes at least one flow mode device; the instant system thus being all pneumatic and having no moving parts. The generating means 10 includes a parabolic reflector 13 which facilates the collimating of what is effectively an acoustical point source, the collimated acoustical beam being indicated at 14. Likewise the receiver or acoustical sensing means 12 is provided with the usual type of parabolic reflector arrangement 15 which is adapted to focus the received acoustical beam to the desired areas of the said sensing means 12; i.e., to the control passage of said flow mode device.

The reflector means 11 is defined here by two cooperating spaced apart rows 16 and 17 of individual acoustical reflectors 20, the acoustical generating means 10 and the sensing means 12 in this case being disposed adjacent the respective ends of the reflector row 16. The plate like reflectors 20 in row 16 are disposed at an angle of substantially 90° with respect to one another, and the same size and mutual arrangement of reflectors 20 are used for row 17. Row 17 is located relative to row 16 such that each reflector of one row redirects said acoustical beam 14 to a corresponding reflector in the other row as is illustrated in the drawings. The initial reflector 20a in row 17 is disposed at an angle of substantially 45° with respect to the initial portion 14a of said acoustical beam while the last reflector 20b in row 17 directs the said beam towards the parabolic reflector 15 of the said sensing means 12.

The reflectors 20 and also the generating and sensing means 10 and 12 may be mounted in any conventional manner on a suitable frame generally indicated at 21. Suitable side supports such as 22 are used to lend rigidity and protection to the reflective surfaces.

In operation the steady state normal condition of the system is such that the collimated acoustical beam 14 generated by means 10 is continuously propagated through a saw tooth course, as illustrated in the drawings, and such maintains the sensing means 12 in one of its two modes of operation. When an acoustically opaque object having an effective cross sectional area greater than one-half to two-thirds of the effective cross sectional area of said acoustical beam 14 penetrates the acoustical sensing curtain defined by the composite course of travel of said beam, the latter will be thereby interrupted and the sensing means 12 will thereby be immediately switched to its other mode of operation thus affording an output signal indicative of the presence of said object. When said object is removed from said curtain the acoustical beam will again be able to be propagated to the sensing means so that the latter will be restored to its original or normal mode of operation indicative of the absence of an object in said curtain.

The instant device is capable of many different uses for example as a safety system to prevent operation of heavy presses and other machines when an operator's hands, arms or other parts of his body are in dangerous locations; or the arrangement can be applied to a security system which initiates an alarm when a person enters a restricted or private area.

Although the acoustical curtain has been illustrated as being flat and substantially rectangular, it will be apparent that other configurations therefor are possible.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. An acoustical sensing curtain, comprising:
    means for generating a collimated acoustical beam;
    a plurality of acoustical reflectors mutually arranged so as to successively reflect said collimated beam back and forth along non-coaxial parallel paths in an area between said reflectors so that substantially no portion of said area is not transversed by said beam whereby a substantially continuous curtain is thereby established over said area; and acoustically sensitive means operatively disposed in the terminal portion of said beam travel for sensing any interruption in the propagation of said beam by the penetration of said curtain by an object to be sensed.

2. Apparatus as defined by claim 1 wherein said generating means includes a whistle, and said sensing means includes a flow mode device.

3. Apparatus as defined by claim 1 wherein the effective cross sectional area of the object to be sensed is greater than one half of the cross sectional area of said collimated beam.

4. Apparatus as defined by claim 1 wherein said reflectors are disposed in two opposed and mutually facing rows.

5. Apparatus as defined by claim 4 wherein at least some of the reflectors in each of said rows are disposed at substantially 90° to their respective adjacent reflectors.

6. An acoustical sensing curtain: comprising means for generating a collimated acoustical beam;

acoustical sensing means adapted to be controlled by said beam; and a plurality of acoustical reflecting means disposed so as to successively intercept and redirect said beam through non-coaxial parallel paths in moving from said generating means to said sensing means so that there is an area adjacent said reflecting means in which there is substantially no portion that is not transversed by said beam, said area thus effectively defining an acoustical curtain whereby when an object to be sensed penetrates said curtain said beam will be interrupted and a signal will be generated by said sensing means indicating the presence of said object.

7. Apparatus as defined by claim 6 wherein said reflecting means includes two opposed and facing rows of acoustical reflectors, the reflectors in each row being mutually disposed at substantially 90° with respect to one another; the first operative reflector being disposed at an angle of substantially 45° with respect to the initial portion of said collimated beam.

8. Apparatus as defined by claim 6 wherein said generating means includes a whistle.

9. Apparatus as defined by claim 6 wherein said sensing means includes a fluidic flow mode device.

* * * * *